United States Patent [19]

Kabat

[11] Patent Number: 5,077,964
[45] Date of Patent: Jan. 7, 1992

[54] CROP HARVESTING METHOD AND APPARATUS

[76] Inventor: Thomas W. Kabat, 7856 Reinbold Rd., Reese, Mich. 48757

[21] Appl. No.: 188,659

[22] Filed: Apr. 29, 1988

Related U.S. Application Data

[63] Continuation of Ser. No. 921,445, Oct. 22, 1986, abandoned.

[51] Int. Cl.$^5$ .................. A01D 45/00; A01D 46/00
[52] U.S. Cl. .................. 56/327.1; 56/13.1
[58] Field of Search .......... 56/327.1, 12.8, 12.9, 56/13.1, 13.2, 14.5, 14.6, 30, 119, 16.5, DIG. 24

[56] References Cited

U.S. PATENT DOCUMENTS

| | | | |
|---|---|---|---|
| 2,593,625 | 4/1952 | Stokes | 56/13.1 |
| 2,699,637 | 1/1955 | Nisbet | 56/13.1 |
| 3,855,760 | 12/1974 | Smith et al. | 56/13.2 |
| 4,449,352 | 5/1984 | Brown | 56/13.1 |
| 4,453,373 | 6/1984 | DeCoene | 56/14.6 |
| 4,458,697 | 7/1984 | James | 56/14.6 |
| 4,470,245 | 9/1984 | Agadi | 56/16.5 |
| 4,550,554 | 11/1985 | Lundahl et al. | 56/364 |
| 4,597,252 | 7/1986 | Williames | 56/13.1 |

FOREIGN PATENT DOCUMENTS

| | | | |
|---|---|---|---|
| 257065 | 2/1965 | Australia | 56/13.1 |
| 2639519 | 3/1978 | Fed. Rep. of Germany | 56/13.1 |

*Primary Examiner*—John G. Weiss
*Attorney, Agent, or Firm*—Learman & McCulloch

[57] ABSTRACT

Apparatus and methods of harvesting dry beans and similar crops supported on plants standing in rows in a field comprises severing the plants above ground level transporting the severed plants to a chamber, and discharging such plants from the chamber to the receiver of a combine from which the plants are delivered to the combine's threshing mechanism at which the crop is separated from the plant stems, foliage, and other debris.

25 Claims, 2 Drawing Sheets

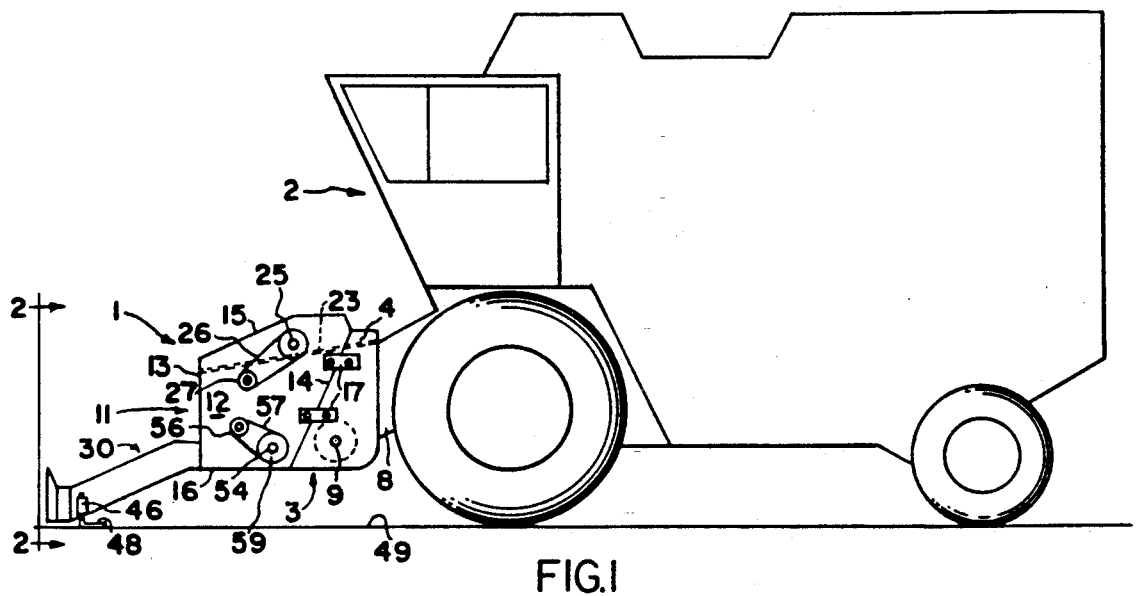
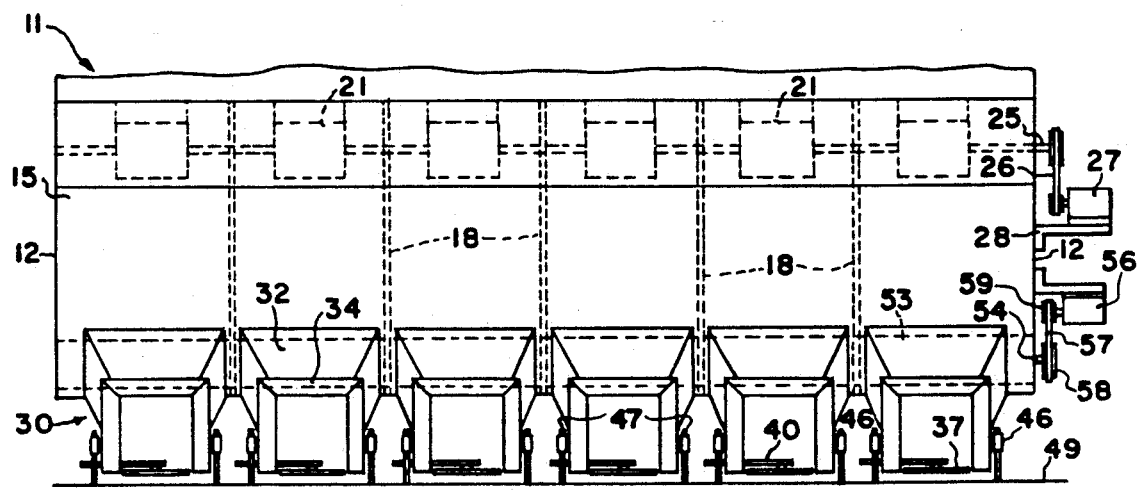
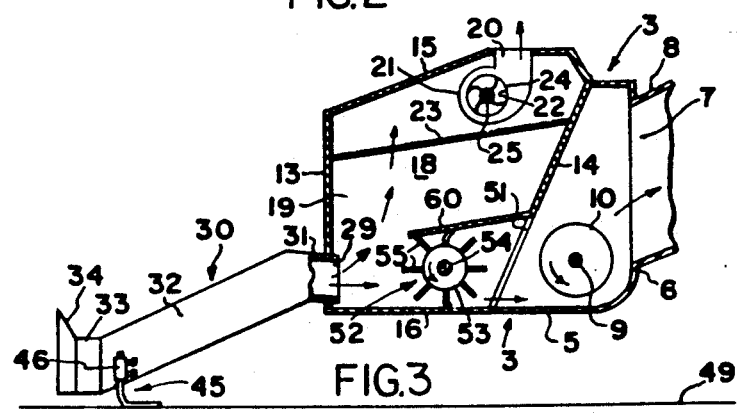

CROP HARVESTING METHOD AND APPARATUS

This is a continuation of co-pending application Ser. No. 921,445 filed on Oct. 22, 1986, now abandoned.

This invention relates to methods and apparatus for harvesting crops standing in a field.

BACKGROUND OF THE INVENTION

In the harvesting of stemmed crops, such as dry beans, it is conventional to mount a so-called bean puller on a tractor which may be driven through a field in which the crop has matured and dried on the vine. A bean puller conventionally includes blades which project forwardly of the tractor and are partially embedded in the ground so as to sever the plant stems from their roots. The tractor also conventionally has mounted thereon a windrower which engages the severed plants and rakes them into windrows. Thereafter, a combine is driven through the field, and collects the windrowed plants, and separates the beans or the like from the stems and other foliage.

The crop harvesting apparatus and method referred to above are quite inefficient for a number of reasons. First, underground severing of the stems from their roots requires frequent sharpening, as well as replacement, of the cutting knives due to their engagement with stones and other debris. Further, the falling of the plants following severing of the stems, coupled with the windrowing operation and the subsequent gathering for combining, results in multiple handling of the plants with consequent loss of beans. In addition, the necessity of having to drive the combine through the field after the pulling and windrowing operations requires at least two passes of motorized equipment through the field with consequent relatively high fuel consumption.

An object of the present invention is to overcome or greatly minimize the disadvantages and inefficiencies referred to above.

SUMMARY OF THE INVENTION

The harvesting of beans or similar dry crops standing in a field is accomplished in accordance with the invention by an attachment that may be mounted at the forward end of a combine and which is provided with a cutter for severing the plant stems slightly above ground level. The plant cutter is located at the leading end of a conduit through which a stream of air flows rearwardly, thereby enabling each severed plant to be entrained in the air stream for transport rearwardly through the conduit. The conduit communicates via an inlet with a chamber formed in a housing that is detachably supported at the leading end of a conventional combine. In communication with the chamber is a fan which generates the aforementioned air stream. The cross sectional area of the chamber is substantially greater than that of the conduit, thereby enabling the air constituting the air stream to expand and decelerate as it passes through the inlet to the chamber. The plants entrained in the air stream thus no longer can be supported by such air stream and are deposited on the bottom of the chamber.

The chamber has an outlet at its lower, trailing end which communicates with the leading end of a receiver carried by the combine in a conventional manner. Rotary crop discharge means is mounted in the housing so as at least partially to occupy the discharge opening, thereby ensuring that most of the air entering the chamber arrives via the crop-entraining air stream referred to earlier. The crop discharge means is provided with crop engaging fingers and is rotated in a direction to enable the fingers to engage and effect discharge of the crop from the chamber to the receiver of the combine. The crop discharged to the combine is delivered in a conventional manner to the threshing apparatus of the combine so as to separate the bean crop from the plant stems, foliage, and pods.

THE DRAWINGS

Apparatus constructed in accordance with the invention is disclosed in the following description and the accompanying drawings, wherein:

FIG. 1 is a side elevational view of the harvesting apparatus attached to the leading end of a conventional combine;

FIG. 2 is a fragmentary, front elevational view taken generally along the line 2—2 of FIG. 1;

FIG. 3 is an enlarged, fragmentary, partly sectional view of the attachment and the leading end of the combine;

THE PREFERRED EMBODIMENTS

Figure 4:
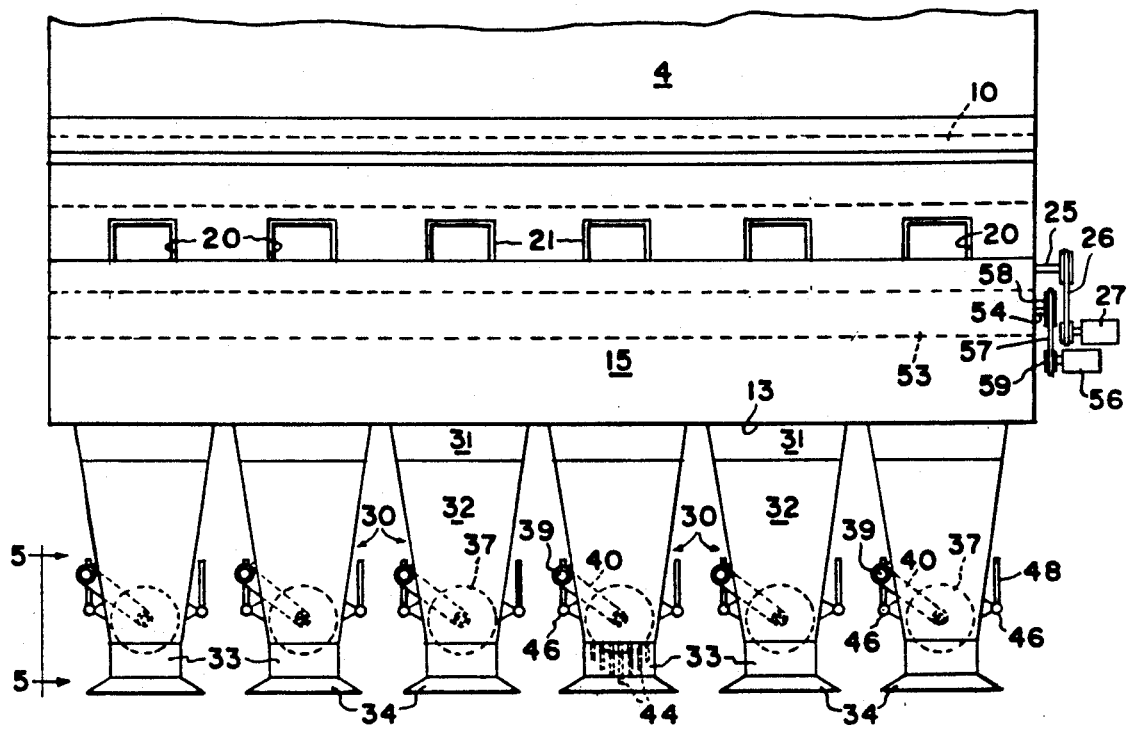
FIG. 4 is a fragmentary, top plan view of the apparatus shown in FIG. 2.

Harvesting apparatus constructed in accordance with the invention is designated generally by the reference character 1 and is adapted for removable attachment to the leading end of a conventional, wheeled grain combine designated 2. As is conventional, the combine 2 supports at its leading end a receiver 3 having spaced side walls 4, a bottom 5, and a rear wall 6 within which is an opening 7 in communication with a passage 8 which leads rearwardly of the combine to the threshing mechanism (not shown). Journaled in suitable bearings (not shown) supported by the end walls 4 of the receiver 3 is an auger shaft 9 provided with a pair of vanes 10, one of which is pitched to feed articles in the receiver 3 from one end wall 4 toward the center and the other of which is pitched to feed materials in the receiver from the opposite end wall toward the center, as is conventional.

The harvester attachment 1 comprises a housing 11 having end walls 12, a front wall 13, a rear wall 14, a top wall 15, and a bottom wall 16. The width of the housing 11 corresponds to that of the combine receiver 3, thereby enabling the housing 11 to be detachably mounted on the receiver 3 by suitable brackets 17 or other appropriate means secured to the side walls 4 and 12, respectively.

Internally of the housing 11 is a plurality of fore and aft extending, transversely spaced partitions 18 which divide the housing into a plurality of side-by-side chambers 19. The upper wall 15 of each chamber has an exhaust opening 20 therein in which is fitted the outlet end of a powerful fan 21 having its inlet opening 22 in communication with the associated chamber 19. Each fan 21 may be mounted in its chamber in any suitable, conventional manner. Between the bottom wall 16 and the upper wall 15 of each chamber, and adjacent the wall 15, is mounted a screen 23 for a purpose presently to be explained.

Each fan has a rotor 24 fixed on a shaft 25 that spans all of the chambers and is driven via a belt 26 from a hydraulic or other suitable motor 27 carried by a bracket 28 fixed to one end wall 12 of the housing.

Figures 5, 6:
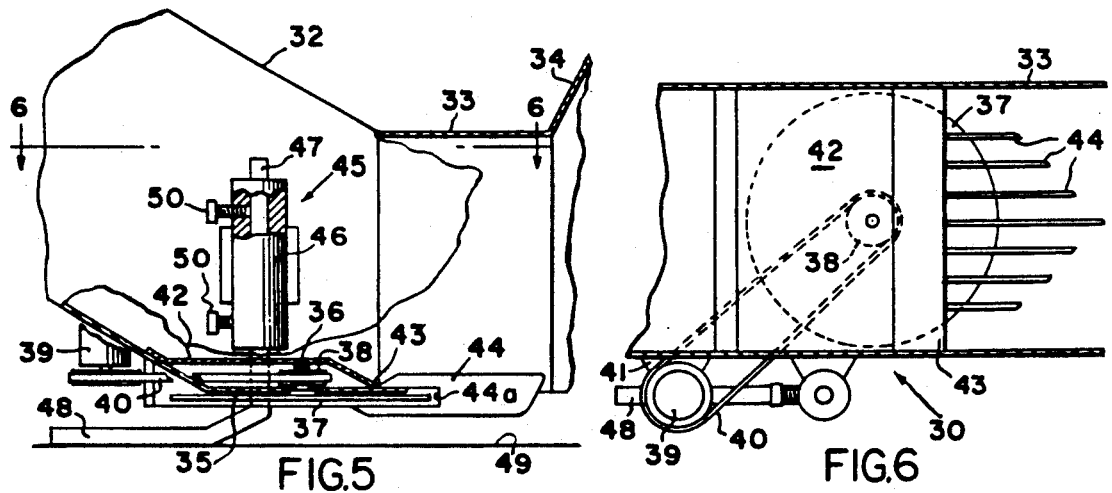
FIG. 5 is a greatly enlarged side elevational view, with parts broken away, as viewed on the lines 5—5 of FIG. 4.
FIG. 6 is a sectional view taken generally along the lines 6—6 of FIG. 5.

At the leading end of the housing 11 the front wall is provided with a plurality of inlet openings 29 corresponding in number and spacing to the number and spacing of the chambers 19. Fitted into each opening 29 is one end of a tubular conduit 30 having at its trailing end a downwardly inclined section 31 which projects into the associated chamber 19. Each conduit 30 also has a forwardly extending section 32 that is inclined downwardly and terminates in a collar 33 at the leading end of which is a bell-like mouth 34. As is shown in FIG. 5 the lower surface of the conduit 32 is provided adjacent the leading end of the conduit with a forwardly extending, substantially horizontal section 35 in which is journaled a stub shaft 36 to which is fixed a rotary cutting blade 37. A pulley 38 also is fixed to the shaft 36 and is coupled to a hydraulic or other suitable driving motor 39 by a drive transmitting belt 40. The motor 39 is mounted on a bracket 41 that is secured to the associated conduit 30.

Overlying the drive transmitting belt 40 is a cover 42 having a leading edge 43 to which is secured a plurality of forwardly extending, transversely spaced stone deflecting teeth 44, each of which has a slot 44a in its trailing edge (see FIG. 5) through which the cutter 37 extends. As is best shown in FIG. 6, not all of the teeth 44 are of equal length. Instead, one tooth is longer than all the others, and the others on opposite sides of the longest tooth are progressively shorter so that, in plan view, the leading edges of the teeth converge toward the central tooth.

At the leading end of each conduit 30 is one or more supports 45 each of which has a vertical sleeve 46 fixed to the associated conduit section 32 and each of which receives a vertical stem 47 of an adjustable ground clearance bar having a substantially horizontal, ground engaging runner 48 that is adapted to bear against the surface 49 of the ground and provide clearance between the ground and the cutter 37. See FIG. 5. The sleeve 46 is provided with adjusting screws 50 by means of which such clearance may be adjusted.

At the trailing end of each chamber 19 the rear wall 14 of the housing is provided with a crop outlet opening 51. Substantially occupying each opening 51 is a crop discharge rotor 52 comprising a roller 53 fixed on a shaft 54 that spans the width of the housing 11. Each roller 53 preferably is provided with radially extending, circumferentially spaced fins 55 formed of flexible, rubbery material. The combined radius of the roller and each fin 55 is greater than one-half the height of the opening 51 so that the roller and fins 55 can effect a partial seal of the opening 51. If desired, the fins 55 may be helically arranged on the roller. All of the discharge rotors 52 are driven simultaneously by a hydraulic or other suitable motor 56 mounted on one of the walls 12 via a driving belt 57 trained around pulleys 58 and 59 fixed on the motor shaft and the rotor shaft 54, respectively.

Preferably, the discharge rotor 52 in each chamber 19 underlies a shelf 60 which is forwardly and downwardly inclined. The spacing between the shelf 60 and the rotor shaft 54 is such that the fins 55 engage the lower surface of the shelf during rotation of the rotor, as is shown in FIG. 3. This arrangement also assists in effecting a partial seal of the opening 51.

Figures 7, 8, 9:
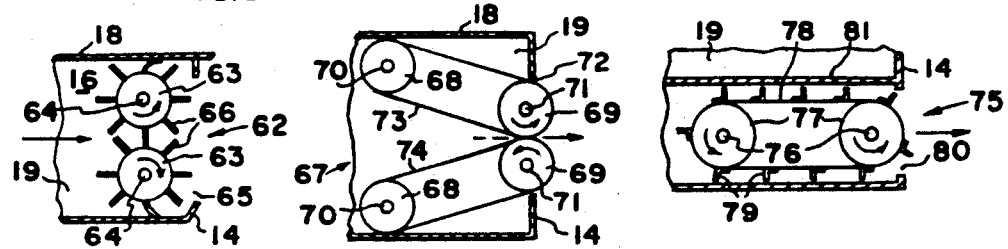
FIGS. 7-9 are diagrammatic plan views, with parts broken away, of alternative forms of crop discharge means.

FIG. 7 discloses an alternative discharge rotor crop discharge means 62. In this embodiment a pair of rollers 63 are fixed on shafts 64 that are journaled in the upper and lower housing walls 15 and 16 for rotation about vertical axes. The rear wall 14 of the housing has a crop outlet opening 65 therein within which is partially occupied by the rollers 63. The rollers are spaced by a gap but have radially extending fins 66 like the fins 55 which occupy the gap and assist in effecting a partial seal of the opening 65.

The shafts 64 are coupled in any suitable manner to hydraulic or other driving motors (not shown) like the motor 56 to effect rotation of the respective shafts in such directions, indicated by the arcuate arrows, that the confronting surfaces of the rollers rotate in the same direction.

FIG. 8 discloses another embodiment of crop discharge means 67 comprising two pairs of rolls 68, 69 journaled on shafts 70 and 71, respectively. The rolls 69 partially occupy a crop outlet opening 72 formed in the rear wall 14 of the housing at the trailing end of each chamber 19.

Trained around one pair of rolls 68 and 69 is an endless belt 73 and trained around the other pair of rolls 68, 69 is a similar endless belt 74. The shafts 69, 70 are driven by suitable hydraulic drive motors (not shown) in such directions, indicated by the arcuate arrows, that the confronting runs of the belts 73 and 74 travel in the same direction and converge toward the trailing end of the chamber 19. Preferably, the trailing rollers 69 are formed of relatively soft, rubbery material so as to enable materials in the nip between the belts 73, 74 easily to pass the rolls 69.

In the embodiment illustrated in FIG. 9 the crop discharge means 75 comprises a pair of longitudinally spaced shafts 76 on which are fixed rollers 77 that are driven by suitable hydraulic motors (not shown) for rotation about horizontal axes in the direction indicated by the arcuate arrows. Trained around the rollers 77 is an endless belt 78 provided with spaced fins or cleats 79. The trailing roller 77 partially occupies a crop outlet opening 80 formed in the trailing wall 14 of the housing. Preferably, a shield 81 is mounted in the chamber 19 and overlies the discharge means 75.

To condition the apparatus for operation, the attachment 1 is fitted to the combine receiver 3 so as to project forwardly of the latter. The ground clearance runners 48 are adjusted to locate the leading end of the conduit 30, and particularly the cutter 37, at an appropriate height to engage and sever, above ground level, the stems of plants standing in rows in a field. The combine then is oriented with respect to the rows of plants so that each of the conduits 30 is aligned with a different row of plants. The motors 39 then may be started so as to drive the cutters 37 and the motor 27 started so as to drive the fans 21. The motor 56 also is started so as to drive the crop discharge rotors 52.

When the combine 1 is driven through the field, the cutter 37 at the leading end of each conduit 30 will sever successively the stem of each plant in a row. Stones and other large, loose objects in the path of the cutters will be deflected by the deflector teeth 44. Operation of each fan will reduce the pressure in the associated chamber 19 to a level below atmospheric pressure sufficient to establish in each conduit 30 an air stream flowing through the associated conduit from the leading end thereof toward the chamber 19. The velocity of the air stream is sufficient that each severed plant will be entrained in the air stream and transported to the associated chamber 19.

The cross sectional area of each chamber 19 is considerably greater than that of the associated conduit 30. Consequently, as the stream of air enters the chamber via the inlet 29 the air expands and decelerates, thereby enabling the entrained plant to fall by gravity to the bottom of the chamber 19. However, to ensure that air will be exhausted from the chamber 19 via the outlet 20 of the fan 21, and to ensure that leaves and other light debris may not enter and clog the fan, the screen 23 is provided.

The plants that are delivered to the chamber 19 enter the latter with a rearward and downward trajectory due to the inclination of the conduit section 31. In most instances the plant thus is within reach of the fins 55 of the rotor 52 which rotates in such direction as to cause the fins to engage and sweep the plant rearwardly through the opening 51 and into the combine receiver 3 for delivery by the conveyor auger to the threshing mechanism in the usual manner.

Although the discharge rotor 52 does not occupy the opening 51 completely, and thus cannot effect an air tight seal of the opening, the unoccupied cross sectional area of the opening 51 is materially less than that of the inlet 29, thereby ensuring establishment of an air stream of sufficient velocity to effect entrainment and transport of the severed plants.

If desired, the discharge means 52 may be replaced by any of the discharge means 62, 67, and 75, all of which function in a manner analogous to that in which the discharge means 52 operates.

In the use of the apparatus disclosed herein, a single traverse of the field by the combine results in severing of all the plants in as many rows as there are cutters and conduits 30, immediate transport of the severed plants to the chambers 19, and the immediate discharge of the severed plants to the combine for separation of the beans or other crop from the pods, stalks, and other debris. As a consequence, resharpening of the cutters is required much less frequently than is the case with the cutting knives of conventional bean harvesters, the plants need not be windrowed or handled multiple times, and not more than one traverse of the field by the combine is required for the harvesting of crops in the affected rows.

The apparatus and methods disclosed herein are representative of preferred embodiments of the invention, but are intended to be illustrative rather than definitive thereof. The invention is defined in the claims.

I claim:

1. Crop harvesting apparatus comprising a housing having walls forming a chamber, one of said walls having a crop inlet therein and another of said walls having a crop outlet therein; a crop receiver in communication with said chamber via said outlet for receiving crops from said chamber; conduit means having an opening at one end thereof for the reception of crops and being in communication at its other end with said inlet; fan means in communication with said chamber for establishing subatmospheric pressure in said chamber and an air stream through said conduit means of such velocity as to entrain crops and deliver them into said chamber via said inlet; crop discharge means for engaging crops in said chamber and discharging them to said receiver via said outlet, said crop discharge means forming a sufficient seal of said outlet to ensure the maintenance of a crop-entraining air stream through said conduit means; and means for engaging crops in said receiver and conducting them from said receiver.

2. Apparatus according to claim 1 wherein said crop has stems and including cutter means at said one end of said conduit means for severing said stems.

3. Apparatus according to claim 2 including ground engageable means carried by said conduit means at said one end for supporting said cutter means at a level to engage said stems.

4. Apparatus according to claim 3 including means for vertically adjusting the position of said ground engageable means.

5. Apparatus according to claim 3 including means carried by said conduit means at said one end for deflecting stones away from said cutter means.

6. Apparatus according to claim 1 wherein said discharge means comprises rotary means and means for effecting rotation of said rotary means.

7. Apparatus according to claim 6 wherein said rotary means has spaced apart fins extending therefrom.

8. Apparatus according to claim 7 wherein said fins are flexible.

9. Apparatus according to claim 1 wherein said discharge means comprises a pair of spaced rotors having confronting surfaces, and means for rotating said pair of rotors in such directions that the confronting surfaces move in the same direction.

10. Apparatus according to claim 9 wherein the spacing between said rotors provides a gap between said confronting surfaces, said rotors having fins extending from said surfaces a distance sufficient to occupy said gap.

11. Apparatus according to claim 9 wherein said rotors comprise endless belts.

12. Apparatus according to claim 11 wherein the confronting surfaces of said belts converge in the direction of said outlet.

13. Apparatus according to claim 1 wherein said discharge means is positioned partially within and partially without said chamber and extends through said outlet.

14. Apparatus for attachment to a combine for harvesting crops standing in a field, said combine having a crops receiver equipped with conveyor means for transferring crops in said receiver to said combine, said apparatus comprising a housing having walls forming a chamber, one of said walls having an inlet therein and another of said walls having an outlet therein in communication with said crops receiver; conduit means in communication at one end with said inlet; cutter means carried by said conduit means at its other end for severing crops; fan means in communication with said chamber for establishing a subatmospheric pressure in said housing and an air stream through said conduit means of such velocity as to entrain severed crops and deliver them into said chamber via said inlet; and crops discharge means for engaging severed crops delivered to said chamber and discharging them into said receiver from said chamber via said outlet, said discharge means maintaining a sufficient seal of said outlet to ensure the maintenance of a crop-entraining air stream through said conduit means.

15. Apparatus according to claim 14 wherein said discharge means at least partially occupies said outlet.

16. Apparatus according to claim 14 wherein said discharge means comprises at least one rotor and means for rotating said rotor.

17. Apparatus according to claim 16 including projecting fins carried by said rotor.

18. Apparatus according to claim 14 wherein said discharge means comprises a pair of rotors spaced from one another and having confronting surfaces, and means for rotating said rotors in such directions that said confronting surfaces move in the same direction.

19. Apparatus according to claim 14 wherein said fan means has an air intake opening in communication with said chamber, and screen means overlying said air intake opening for preventing the admission of severed crops thereto.

20. Apparatus according to claim 14 wherein said chamber has a cross-sectional area greater than that of said conduit means.

21. Apparatus according to claim 14 wherein said crop discharge means is wholly independent of said conveyor means.

22. A method of harvesting crops standing in a field and supported by stems, said method comprising severing said crops from said stems; entraining the severed crops in an air stream and delivering them via an inlet into a chamber having an outlet therein through which the crops may be discharged to a crop receiver; engaging the crops in said chamber and driving them out of said chamber via said outlet and into said receiver; maintaining at all times a sufficient seal of said outlet to ensure the maintenance of a sufficient velocity of said air stream to effect entrainment and delivery of said crops into said chamber decelerating said air stream in said chamber an amount sufficient to enable the entrained crops to fall by gravity to the bottom of chamber; and removing crops from said receiver.

23. The method according to claim 22 wherein said air stream is established by maintaining within said chamber a subatmospheric pressure.

24. The method according to claim 22 including exhausting air from said chamber via an opening other than said inlet and said outlet.

25. The method according to claim 24 including screening said opening to prevent severed crops from entering said opening.

* * * * *